United States Patent Office 3,555,547
Patented Jan. 12, 1971

3,555,547
REFERENCE VOLTAGE REGULATOR IN A RADAR RECEIVER
Erik Ragnar Arvidsson, Lindome, Sweden, assignor to Telefonaktiebolaget L M Ericsson, Stockholm Sweden, a corporation of Sweden
Filed Oct. 11, 1967, Ser. No. 674,522
Claims priority, application Sweden, Nov. 20, 1966, 16,356/66
Int. Cl. G01s 9/02
U.S. Cl. 343—7        4 Claims

ABSTRACT OF THE DISCLOSURE

In a radar receiver a reference voltage is generated to provide a clip level for received signals. The signals which exceed the clip level are used to generate a pulse count whose value is a function of the time duration of passed signals during a portion of the period between two range pulses transmitted by the radar transmitter. A positive or negative signal is generated in accordance with whether or not the actual count value exceeds a given count value during the period. The signal so generated is integrated to provide the reference voltage for the next period.

---

Figure 1:
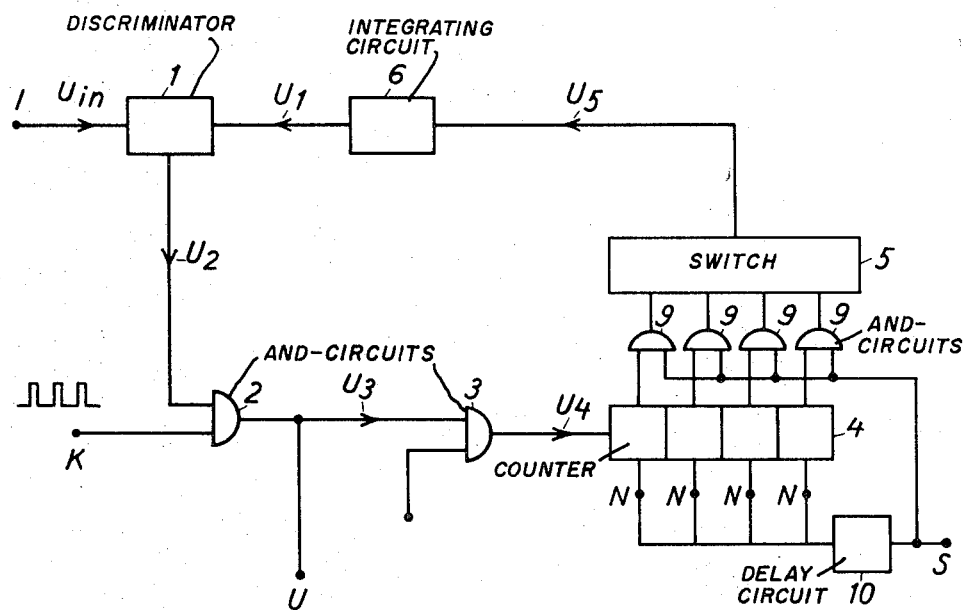

The present invention refers to methods and apparatus for regulating a reference voltage and more particularly, for regulating such a voltage which is used as a comparison standard for received radar signals.

If one wishes to process digitally radar signals, it is first necessary to convert the analog echo signals received by the radar receiver to digital signals. One common method of performing this analog-to-digital conversion is to feed the analog echo signals to an amplitude discriminator for comparison with a definite amplitude reference voltage. A DC output signal is transmitted from the discriminator whenever the amplitude of the analog signal exceeds the amplitude of the reference voltage. The output signal not only represents the true echo signals but also those noise signals whose amplitude exceeds the amplitude of the reference voltage. The output signal is chopped to pulses which represent a binary word, where the "ones" correspond to the part of the received signal which exceeds the reference voltage and the "zeros" correspond to the part which does not exceed the reference voltage. If the reference voltage is adjusted to such a high value that all the received noise would be registered as "zeros" then a large number of faint echoes would be registered as "zeros." This is not desirable. It is however of great importance that the probability of the occurrence of "ones" caused by the noise be kept as constant as possible. To keep this probability constant one has heretofore counted the received "ones" and caused the reference voltage to increase or decrease as the number of "ones" had increased or decreased to keep the number of "ones" within definite limits. This however implies that other real echoes and other disturbances besides the noise (for example rain echoes) will increase the reference voltage and the probability of detecting faint echoes is considerably decreased.

The present invention is intended to provide a method and an arrangement for carrying out the method where the above mentioned drawbacks are eliminated. According to the invention the received signal is compared with the reference voltage and a direct voltage is obtained during the time when the received signal exceeds this reference voltage. The direct voltage is chopped into pulses of a definite frequency. These pulses are counted during a definite part of the time interval between two pulses emitted from the radar transmitter and a regulating direct voltage is given a positive or a negative value during the following interval depending on whether or not the number of counted pulses exceeds a definite value. The direct voltage is integrated whereby an increasing or a decreasing voltage is obtained which is used as the reference voltage.

Apparatus for realizing the invention comprises a discriminator having one input which receives the received signal and another input which receives the reference voltage. A direct voltage is obtained at the output of the discriminator when the received signal exceeds the reference voltage. One input of a first and-circuit is connected to the discriminator while a second input of this circuit is connected to a source of input pulses of a definite frequency whereby pulse formed signals are obtained at the output of the and-circuit. When a direct voltage signal exists it is fed to one input of a second and-circuit whose other input receives a gating signal only during a certain terminal portion of the interval between two pulses emitted from the radar transmitter. The output of the second and-circuit is connected to a counter, in which the pulse formed signals received from said second and-circuit during said interval portion are counted. The counter controls a switch in such a way that the switch supplies a positive or a negative regulating direct voltage to its output, depending on whether the signals counted during the interval part exceed a certain value or not. The output of the switch is connected to an integrating circuit which integrates the regulating direct voltage, the integrated voltage increases or decreases depending on whether the regulating direct voltage is positive or negative, the integrating voltage being the reference voltage supplied to the second input of the discriminator.

Figure 2:
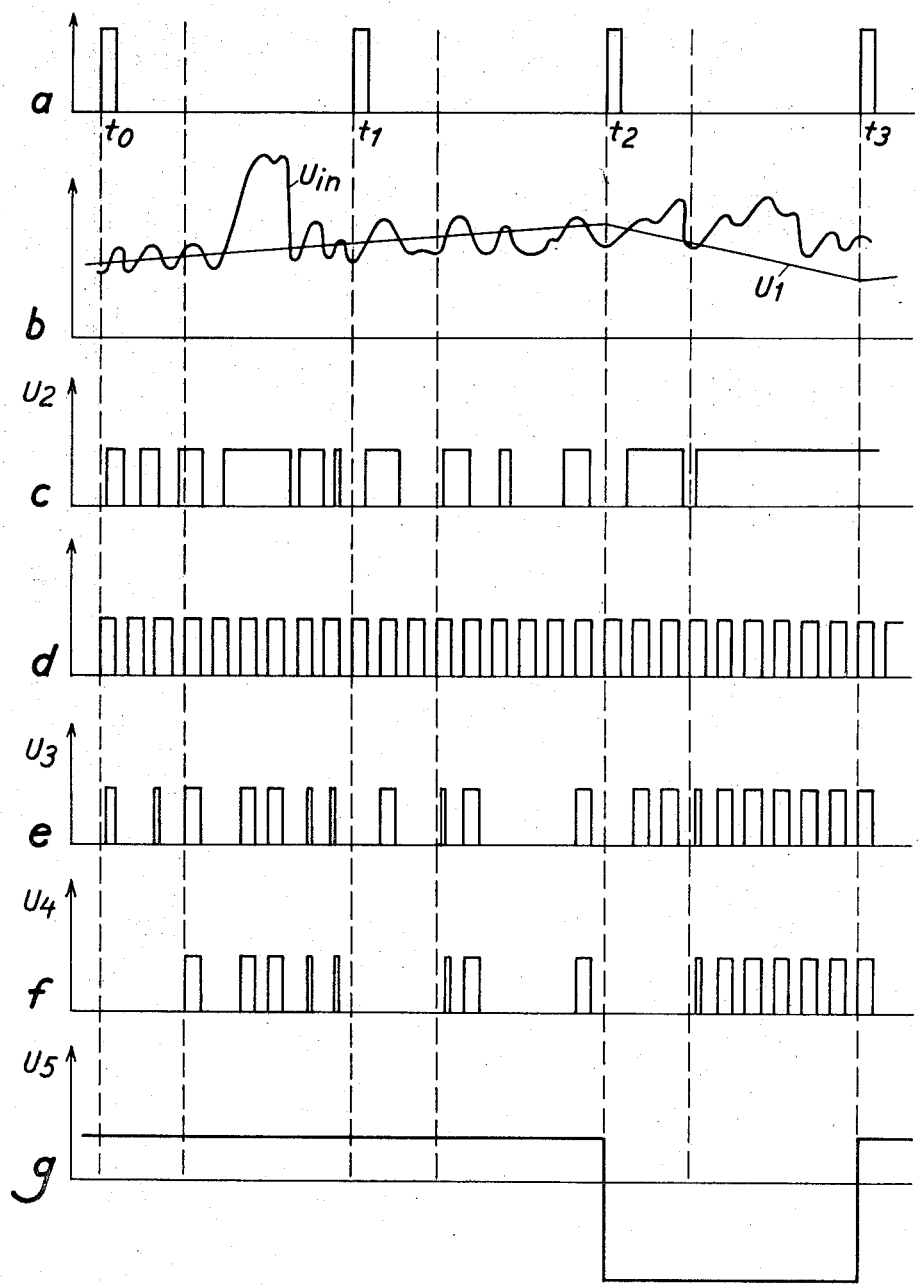

The invention will be closer described in the following detailed description when read with accompanying drawings in which FIG. 1 shows a block diagram of the arrangement according to the invention and FIG. 2 is a waveform diagram explaining the principle of the invention. In FIG. 1 reference 1 indicates a discriminator to which the received analog signal is supplied from the input I of the arrangement. In the discriminator the signal is compared with a reference voltage $U_1$ regulated by the regulating process as will be explained below. From the discriminator an output signal $U_2$ is obtained if the analog signal exceeds the reference voltage. This output signal is supplied to one input of an and-circuit 2. The other input K of the and-circuit 2 receives clock pulses of a frequency corresponding to the range resolution of the radar receiver. Thus a pulse formed signal $U_3$ is obtained at the output of the and-circuit 2. In this signal the pulse positions indicate the distance to the targets and their number indicaes the length of time during which the received signal exceeds the reference voltage. The output of the and-circuit 2 which is the output of the arrangement is also connected to one input of an and-circuit 3 whose other input receives a signal during the part of the interval between the pulses emitted from the transmitter during which the echoes from the most remote targets appear, for example during the last two thirds of the pulse interval. The output signal of the and-circuit 3 is supplied to a counter 4 which can be a binary counter and which is also provided with a zero-setting input N for each digit position. Each of the outputs of the different stages of the counter 4 is connected to one input of a different one of the and-circuits 9. The other input of each of these and-circuits is connected to a pulse source S which generates a pulse when a pulse is emitted from the radar transmitter. The pulses from the source S are also applied via a delay circuit 10 to the zero-setting inputs N of the counter 4. In this way the counter will be set to zero with a small delay after obtaining the signals from the outputs of the and-circuit 9. These signals are supplied to a switch 5 which, depending on whether the number of the counted pulses exceeds a certain value or not, connects a positive or a negative voltage to its output until the switch is operated by a new number from the counter. This output signal is supplied to an integrating circuit 6 which generates the reference voltage $U_1$ which, depending on whether the voltage from the switch 5 is positive or negative, has an increasing or decreasing value. As the absolute value of the negative voltage is greater than the absolute value of the positive voltage, the decreasing part of the reference voltage will be steeper than the increasing part.

FIG. 2 shows a simplified example of the signals appearing in the arrangement according to FIG. 1. If the waveform $b$ of the incoming signal between the points of time $t0$ and $t1$ in FIG. 2 is studied it appears that the amplitude of signal $U_{in}$ varies about the slowly increasing reference voltage $U_1$. As shown in waveform $c$ an output signal $U_2$ is obtained at the output of the discriminator 1 when signal $U_{in}$ exceeds the reference voltage $U_1$. Waveform $d$ shows the clock pulses supplied to the and-circuit 2. At the output of the and-circuit 2 pulses are obtained only during the time when the clock pulses and the signal $U_2$ appear simultaneously as shown, by waveform $e$. As mentioned above the and-circuit 3 is blocked during the time when the echoes from nearby situated targets are received as shown by waveform $f$. During the interval $t0$–$t1$ the number of binary "ones" in the binary word representing the pulse series is supposed to be so large that when the result in the counter, by means of the pulse from the voltage source S, waveform $a$ at the point of time $t1$ is transferred to the switch 5, the switch supplies a positive output signal as shown in waveform $g$. During the interval $t1$–$t2$ the value of the received signal is changed in relation to the reference voltage whereby the length of the output signal of the discriminator and consequently the number of "ones" in the binary word representing the pulse series at the output of the circuit 3 decreases as is obvious from waveform $2f$. According to the example this number is supposed to be so small that the switch 5, when receiving the counting result from the counter 4 at the point of time $t2$ determines that a voltage switch is to take place and the negative voltage value is supplied to the integrating circuit 6. See waveform 9. The reference voltage will now steeply drop which implies that at a supposed maintained input signal level the complete length of the pulse formed output signals from the discriminator will increase. Hereby also the number of "ones" in the binary word will increase as the part $t2$–$t3$ of waveform $f$ shows. This number is supposed to exceed a critical value of the one switch 5 so that its output signal will become positive and the reference voltage will have a slowly increasing waveform.

Obviously the arrangement according to the invention will have the advantage compared with previously known arrangements because the regulating of the reference voltage will not be affected in an inconvenient way as long as the noise is limited to certain sectors. Contrary to the regulating process of the known arrangements where the reference voltage varies proportionally to the number of "ones" in the pulse series representing the word, the process of the present invention causes a slow increase of the reference voltage until the number of "ones" is below a certain value and not until then does a fast decrease of the reference voltage take place. In addition nearby situated sources, for example ground echoes, will not affect the reference voltage.

I claim:

1. In a radar system apparatus for regulating a reference voltage in the radar receiver of said system comprising a discriminator to one input of which the received signal is supplied and to a second input of which said reference voltage is supplied, a direct voltage being obtained at the output of the discriminator when the received signal exceeds the reference voltage, a first and-circuit having a first input connected to the output of said discriminator and a second input means for applying pulses of a definite frequency to said second input so as to obtain pulse formed signals at the output of said first and-circuit during the occurrence of said direct voltage signal, a second and-circuit having a first input connected to means for applying a signal during a certain last portion of the interval between two pulses emitted from the radar transmitter of said system and a second input connected to the output of said first and-circuit, a counter having an input connected to the output of said second and-circuit for counting the pulse formed signals received from said second and-circuit during said certain last portion, a switch having its input connected to at least one output of said counter and supplying a positive or a negative regulating direct voltage to its output, depending on whether the counting result obtained in the counter at the end of the certain last portion exceeds a certain value or not, and an integrating circuit having its input connected to the output of said switch and integrating the regulating direct voltage, the integrated voltage being increasing or decreasing depending on whether the regulating direct voltage is positive or negative, the output of said integrating circuit being connected to said second input of the discriminator.

2. A method for regulating a reference voltage in the receiver portion of a radar system wherein the amplitude of the reference voltage is used for comparison with the amplitude of received signals, said method comprising the steps of:

generating a plurality of timing pulses, the number of generated timing pulses being linearly related to the time which the amplitude of the received signals exceeds the amplitude of the reference voltage during a given portion of the time interval between successive output pulses transmitted by the transmitter portion of a radar system;

selectively generating a first intermediate voltage of a constant first amplitude and a first polarity whenever the number of timing pulses exceeds a given number during said time interval or an intermediate second voltage of a constant second amplitude and a second polarity whenever the number of generated timing pulses is less than said given number during said time interval; and integrating said intermediate voltages to provide said reference voltage, which increases or decreases in accordance with the polarity of the generated intermediate voltage.

3. The method of claim 2 wherein said second intermediate voltage has an amplitude considerably greater than the amplitude of said first intermediate voltage.

4. The method of claim 2 wherein said given portion of the time interval between said successive output pulse occurs at the end of said time interval.

References Cited

UNITED STATES PATENTS

| | | | |
|---|---|---|---|
| 3,312,969 | 4/1967 | Halsted | 343—5 |
| 3,374,479 | 3/1968 | Moore | 343—7 |
| 3,380,018 | 4/1968 | Littrell et al. | 343—5X |
| 3,430,235 | 2/1969 | Bender et al. | 343—7 |
| 3,487,405 | 12/1969 | Molho et al. | 343—7 |

RODNEY D. BENNETT, JR., Primary Examiner

T. H. TUBBESING, Assistant Examiner

U.S. Cl. X.R.

343—5